US011990083B2

(12) United States Patent
Xuan et al.

(10) Patent No.: US 11,990,083 B2
(45) Date of Patent: May 21, 2024

(54) PIXEL DRIVE CIRCUIT, METHOD FOR DRIVING THE SAME, AND DISPLAY DEVICE

(71) Applicant: BOE Technology Group Co., Ltd., Beijing (CN)

(72) Inventors: Minghua Xuan, Beijing (CN); Haoliang Zheng, Beijing (CN); Seungwoo Han, Beijing (CN); Qi Qi, Beijing (CN); Jing Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 208 days.

(21) Appl. No.: 17/628,380

(22) PCT Filed: Mar. 30, 2021

(86) PCT No.: PCT/CN2021/084100
§ 371 (c)(1),
(2) Date: Jan. 19, 2022

(87) PCT Pub. No.: WO2022/204985
PCT Pub. Date: Oct. 6, 2022

(65) Prior Publication Data
US 2023/0360585 A1 Nov. 9, 2023

(51) Int. Cl.
*G09G 3/32* (2016.01)
*G09G 3/20* (2006.01)

(52) U.S. Cl.
CPC ............ *G09G 3/32* (2013.01); *G09G 3/2007* (2013.01); *G09G 2300/0819* (2013.01); *G09G 2300/0852* (2013.01); *G09G 2300/0861* (2013.01); *G09G 2310/0286* (2013.01); *G09G 2310/08* (2013.01); *G09G 2320/0233* (2013.01)

(58) Field of Classification Search
CPC ............................... G09G 3/32; G09G 3/2007
See application file for complete search history.

(56) References Cited

FOREIGN PATENT DOCUMENTS

| | | | |
|---|---|---|---|
| CN | 106920508 A | * | 7/2017 |
| CN | 106920508 A | | 7/2017 |
| CN | 108538241 A | | 9/2018 |
| CN | 109872680 A | | 6/2019 |
| CN | 109920371 A | | 6/2019 |
| CN | 110010057 A | | 7/2019 |

* cited by examiner

*Primary Examiner* — Sardis F Azongha
(74) *Attorney, Agent, or Firm* — Nath, Goldberg & Meyer; Joshua B. Goldberg

(57) ABSTRACT

Embodiments of the present disclosure provide a pixel drive circuit, a method for driving the pixel drive circuit, and a display device. The pixel drive circuit includes: a drive sub-circuit, a write sub-circuit and a control circuit. The control circuit further is coupled to a light-emitting control signal terminal, a second scanning signal terminal and a second data signal terminal, and is configured to determine a duration of providing a driving signal to a to-be-driven element under control of a light-emitting control signal provided by the light-emitting control signal terminal and a second scanning signal provided by the second scanning signal terminal.

10 Claims, 11 Drawing Sheets

PIXEL DRIVE CIRCUIT, METHOD FOR DRIVING THE SAME, AND DISPLAY DEVICE

This is a National Phase Application filed under 35 U.S.C. 371 as a national stage of PCT/CN2021/084100, filed on Mar. 30, 2021.

TECHNICAL FIELD

The present disclosure relates to the field of display technology, and specifically relates to a pixel drive circuit, a method for driving the pixel drive circuit, and a display device.

BACKGROUND

Compared with an organic light-emitting diode (OLED) display device, a micro light-emitting diode display device (e.g., a Micro LED or MiniLED display device) has the advantages of low driving voltage, long service life, wide temperature resistance, and the like, and is gradually applied to the field of mobile terminals.

SUMMARY

Embodiments of the present disclosure provide a pixel drive circuit, a method for driving the pixel drive circuit, and a display device, which can provide a pixel drive circuit for driving a light-emitting device to emit light.

According to one aspect of the present disclosure, there is provided a pixel drive circuit, including: a drive sub-circuit, a write sub-circuit and a control circuit coupled at a first node.

In an embodiment, the write sub-circuit is further coupled to a first scanning signal terminal and a first data signal terminal, and is configured to write a first data voltage from the first data signal terminal to the first node under control of a first scanning signal provided by the first scanning signal terminal;

In an embodiment, the control circuit is further coupled to a light-emitting control signal terminal, a second scanning signal terminal and a second data signal terminal, and is configured to determine a duration of providing a driving signal to a to-be-driven element under control of a light-emitting control signal provided by the light-emitting control signal terminal and a second scanning signal provided by the second scanning signal terminal.

In an embodiment, the drive sub-circuit is configured to generate the driving signal for driving the to-be-driven element based on the first data voltage and a first power supply voltage supplied from the first power supply terminal.

In an embodiment, the control circuit includes a light-emitting control circuit and a gray scale control circuit.

In an embodiment, the light-emitting control circuit is coupled to the light-emitting control signal terminal, the drive sub-circuit, and the gray scale control circuit, and is configured to transmit, under control of a light-emitting control signal provided by the light-emitting control signal terminal, the first power supply voltage supplied from the first power supply terminal to the drive sub-circuit, and transmit the driving signal generated by the drive sub-circuit to the gray scale control circuit.

In an embodiment, the gray scale control circuit is further coupled to the second scanning signal terminal and the second data signal terminal, and is configured to determine whether to transmit the driving signal to the to-be-driven element under control of a second scanning signal provided by the second scanning signal terminal and a second data voltage provided by the second data signal terminal.

In an embodiment, the pixel drive circuit further includes a compensation sub-circuit.

In an embodiment, one terminal of the compensation sub-circuit is coupled to the drive sub-circuit at the first node, and another terminal of the compensation sub-circuit is coupled to the drive sub-circuit at a second node, and the compensation sub-circuit is configured to write a threshold voltage of the drive sub-circuit to the second node.

In an embodiment, the compensation sub-circuit includes a first capacitor.

In an embodiment, one end of the first capacitor is coupled to the first node, and the other end of the first capacitor is coupled to the second node.

In an embodiment, the pixel drive circuit further includes a reset sub-circuit.

In an embodiment, the reset sub-circuit is coupled to a reset voltage terminal, a reset control signal terminal, and the second node, and is configured to transmit a reset voltage supplied from the reset voltage terminal to the drive sub-circuit under control of the reset control signal terminal.

In an embodiment, the reset sub-circuit includes a first transistor.

In an embodiment, a control electrode of the first transistor is coupled to the reset signal control terminal, a first electrode of the first transistor is coupled to the reset voltage terminal, and a second electrode of the first transistor is coupled to the second node.

In an embodiment, the write sub-circuit includes a second transistor.

In an embodiment, a control electrode of the second transistor is coupled to the first scanning signal terminal, a first electrode of the second transistor is coupled to the first data signal terminal, and a second electrode of the second transistor is coupled to the first node.

In an embodiment, the drive sub-circuit includes a third transistor and a storage capacitor.

In an embodiment, a control electrode of the third transistor is coupled to the second node, a first electrode of the third transistor is coupled to the light-emitting control circuit, and a second electrode of the third transistor is coupled to the first node.

In an embodiment, one end of the storage capacitor is coupled to the first power supply terminal, and the other end of the storage capacitor is coupled to the second node.

In an embodiment, the light-emitting control circuit includes a fourth transistor and a fifth transistor.

In an embodiment, a control electrode of the fourth transistor is coupled to the light-emitting control signal terminal, a first electrode of the fourth transistor is coupled to the to-be-driven element, and a second electrode of the fourth transistor is coupled to the first electrode of the third transistor.

In an embodiment, a control electrode of the fifth transistor is coupled to the light-emitting control signal terminal, a first electrode of the fifth transistor is coupled to the first node, and a second electrode of the fifth transistor is coupled to the gray scale control circuit.

In an embodiment, the gray scale control circuit includes a sixth transistor, a seventh transistor, and a second capacitor.

In an embodiment, a control electrode of the sixth transistor, one end of the second capacitor, and a first electrode of the seventh transistor are coupled at a third node, a first electrode of the sixth transistor is coupled to the second electrode of the fifth transistor, a second electrode of the sixth transistor is coupled to the second power supply terminal, and the other end of the second capacitor is coupled to a third power supply terminal, and a control electrode of the seventh transistor is coupled to the second scanning signal terminal, and a second electrode of the seventh transistor is coupled to the second data signal terminal.

In an embodiment, the to-be-driven element is a micro light-emitting diode, and the driving signal is a drive current for driving the micro light-emitting diode to emit light.

In an embodiment, the pixel drive circuit further includes a reset voltage terminal, a reset control signal terminal, the light-emitting control signal terminal, the first data signal terminal, a second data signal terminal, the first scanning signal terminal, the second scanning signal terminal, the first power supply terminal, second and third power supply terminals, a reset sub-circuit, and a compensation sub-circuit, wherein the reset sub-circuit includes a first transistor, the compensation sub-circuit includes a first capacitor, the write sub-circuit includes a second transistor, the drive sub-circuit includes a storage capacitor and a third transistor, and the control circuit includes fourth to seventh transistors and a second capacitor.

In an embodiment, a first electrode of the first transistor, one end of the first capacitor, a control electrode of the third transistor, and one end of the storage capacitor are coupled at a second node, a control electrode of the first transistor is coupled to the reset signal control terminal, a second electrode of the first transistor is coupled to the reset voltage terminal, the other end of the storage capacitor is coupled to the first power supply terminal, the other end of the first capacitor, a second electrode of the third transistor, a first electrode of the second transistor, and a first electrode of the fifth transistor are coupled at the first node, a first electrode of the third transistor is coupled to a second electrode of the fourth transistor, a first electrode of the fourth transistor is coupled to a first electrode of the to-be-driven element, and a control electrode of the fourth transistor is coupled to the light-emitting control signal terminal, the other electrode of the to-be-driven element is coupled to the first power supply terminal, and a control electrode of the second transistor is coupled to the first scanning signal terminal, and a second electrode of the second transistor is coupled to the second data signal terminal, a control electrode of the fifth transistor is coupled to the light-emitting control signal terminal, a second electrode of the fifth transistor is coupled to a first electrode of the sixth transistor, and a control electrode of the sixth transistor, one end of the second capacitor, and a first electrode of the seventh transistor are coupled at a third node, a second electrode of the sixth transistor is coupled to the second power supply terminal, and a control electrode of the seventh transistor is coupled to the second scanning signal terminal, and a second electrode of the seventh transistor is coupled to the second data signal terminal, and the other end of the second capacitor is coupled to the third power supply terminal.

The present disclosure further provides a display device, including a display panel having a display area with a plurality of sub-pixels, each of the plurality of sub-pixels having the pixel drive circuit according to any one of the embodiments of the present disclosure disposed therein.

An embodiment of the present disclosure provides a method for driving a pixel drive circuit. In the method, a plurality of scanning phases are included in one image frame, each of the plurality of scanning phases including a first scanning phase and a second scanning phase; the gray scale control circuit includes a light-emitting control circuit and a gray scale control circuit; the driving method includes: within one image frame, providing, in a data write phase, the first scanning signal to the first scanning signal terminal, and the first data voltage to the first data signal terminal, and writing the first data voltage into the drive sub-circuit via the write sub-circuit; providing, in the first scanning phase, the second scanning signal to the second scanning signal terminal, and a second data voltage to the second data signal terminal such that the gray scale control circuit provides a current-connection path or a current-disconnection path to the to-be-driven element under control of the second scanning signal and the second data voltage; and providing a light-emitting control signal to the light-emitting control signal terminal such that the light-emitting control circuit provides a current-connection path to the to-be-driven element under control of the light-emitting control signal; and providing, in the second scanning phase, the second scanning signal to the second scanning signal terminal, and the second data voltage to the second data signal terminal such that the gray scale control circuit provides the current-connection path or the current-disconnection path to the to-be-driven element under control of the second scanning signal and the second data voltage; and providing the light-emitting control signal to the light-emitting control signal terminal such that the light-emitting control circuit provides the current-connection path to the to-be-driven element under control of the light-emitting control signal, wherein in response to the second data voltage at an active level, the to-be-driven element is driven under common control of the current-connection path provided by the gray scale control circuit and the current-connection path provided by the light-emitting control circuit; and in response to the second data voltage at an inactive level, the to-be-driven element is not driven under common control of the current-disconnection path provided by the gray scale control circuit and the current-connection path provided by the light-emitting control circuit.

In an embodiment, the first scanning phase includes a first data read phase and a first light-emitting phase, and the second scanning phase includes a second data read phase and a second light-emitting phase, in the first data read phase, the second scanning signal is provided to the second scanning signal terminal, the second data voltage at an inactive level is provided to the second data signal terminal, and the gray scale control circuit provides the current-connection path to the to-be-driven element, and in the first light-emitting phase, the light-emitting control signal is provided to the light-emitting control signal terminal, and the light-emitting control circuit provides the current-connection path to the to-be-driven element while the gray scale control circuit provides the current-disconnection path to the to-be-driven element so that the to-be-driven element is not driven in the first light-emitting phase; and in the second data read phase, the second scanning signal is provided to the second scanning signal terminal, the second data voltage at an active level is provided to the second data signal terminal, and the gray scale control circuit provides the current-connection path to the to-be-driven element until end of the second light-emitting phase, and in the second light-emitting phase, the light-emitting control signal is provided to the light-emitting control signal terminal, and both the light-emitting control circuit and the gray scale control circuit provide the current-connection path to the to-be-driven element so that the to-be-driven element is driven in the second light-emitting phase.

In an embodiment, the first scanning phase includes a first data read phase and a first light-emitting phase, and the second scanning phase includes a second data read phase and a second light-emitting phase, in the first data read phase, the second scanning signal is provided to the second scanning signal terminal, the second data voltage at an active level is provided to the second data signal terminal, and the gray scale control circuit provides the current-connection path to the to-be-driven element until end of the first light-emitting phase, and in the first light-emitting phase, the light-emitting control signal is provided to the light-emitting control signal terminal, and both the light-emitting control circuit and the gray scale control circuit provide the current-connection path to the to-be-driven element so that the to-be-driven element is driven in the first light-emitting phase; and in the second data read phase, the second scanning signal is provided to the second scanning signal terminal, the second data voltage at an active level is provided to the second data signal terminal, and the gray scale control circuit provides the current-connection path to the to-be-driven element until end of the second light-emitting phase, and in the second light-emitting phase, the light-emitting control signal is provided to the light-emitting control signal terminal, and both the light-emitting control circuit and the gray scale control circuit provide the current-connection path to the to-be-driven element so that the to-be-driven element is driven in the second light-emitting phase.

In an embodiment, the pixel drive circuit further includes a first capacitor as a compensation sub-circuit, and a reset sub-circuit, one end of the first capacitor is coupled to the first node, and the other end of the first capacitor is coupled to a second node, and the reset sub-circuit is coupled to a reset voltage terminal a reset control signal terminal, and the second node, and prior to the data write phase, the method further includes: providing, in a reset phase, a reset control signal to the reset control signal terminal, and the first scanning signal to the first scanning signal terminal, writing a reset voltage into one end of the first capacitor via the reset sub-circuit, and writing the first data signal into the other end of the first capacitor via the write sub-circuit, to reset potentials at two ends of the first capacitor.

In an embodiment, the drive sub-circuit includes a third transistor and a storage capacitor, a control electrode of the third transistor is coupled to the second node, a first electrode of the third transistor is coupled to the light-emitting control circuit, and a second electrode of the third transistor is coupled to the first node, and one end of the storage capacitor is coupled to the first power supply terminal, and the other end of the storage capacitor is coupled to the second node, and prior to the data write phase and after the reset phase, the method further includes: a threshold compensation phase of stopping providing the reset control signal to the reset control signal terminal, and continuing providing the first scanning signal to the first scanning signal terminal such that a threshold voltage of the third transistor is stored in the first capacitor.

In an embodiment, the data write phase and the first data read phase of the first scanning phase are performed simultaneously.

In an embodiment, the second data read phase occupies the same duration as the first data read phase.

BRIEF DESCRIPTION OF DRAWINGS

In order to explain embodiments of the present disclosure or technical solutions in related art more clearly, drawings required for description of the embodiments or the related art will now be illustrated briefly, where obviously, the drawings described below are merely some embodiments of the present disclosure, and other drawings may be obtained by those of ordinary skill in the art based on these drawings without any creative labor.

DETAIL DESCRIPTION OF EMBODIMENTS

The technical solutions in the embodiments of the present disclosure will be described clearly and completely below with reference to the accompanying drawings in the embodiments of the present disclosure. Obviously, the described embodiments are merely some but not all embodiments of the present disclosure. All other embodiments obtained by the those of ordinary skill in the art based on the embodiments of the present disclosure without paying any creative effort shall be included in the protection scope of the present disclosure.

Figure 1A:
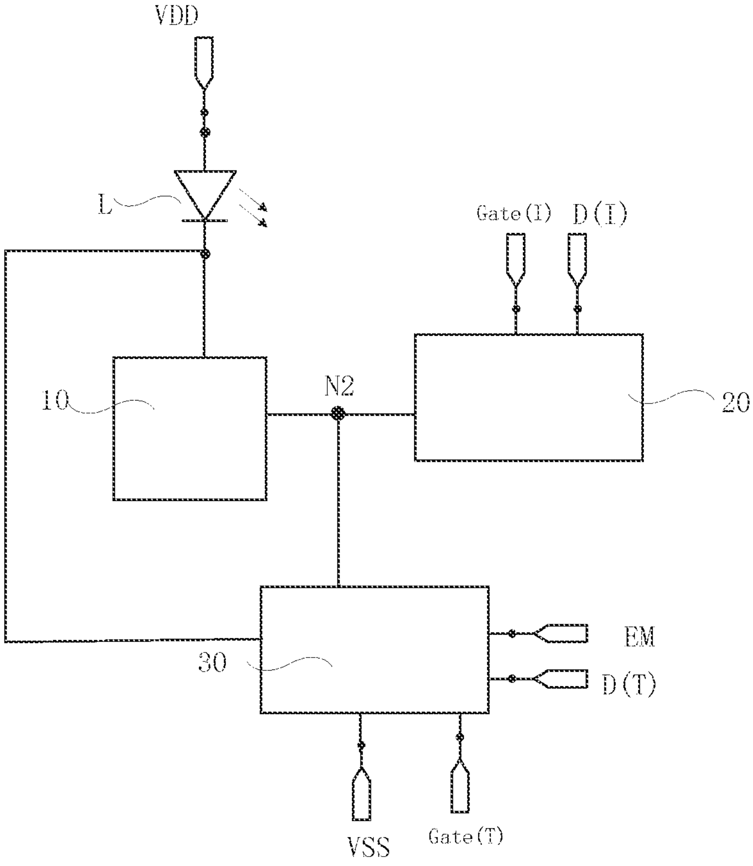
FIG. 1A shows a block diagram of a pixel drive circuit according to some embodiments of the present disclosure.
Figure 1B:
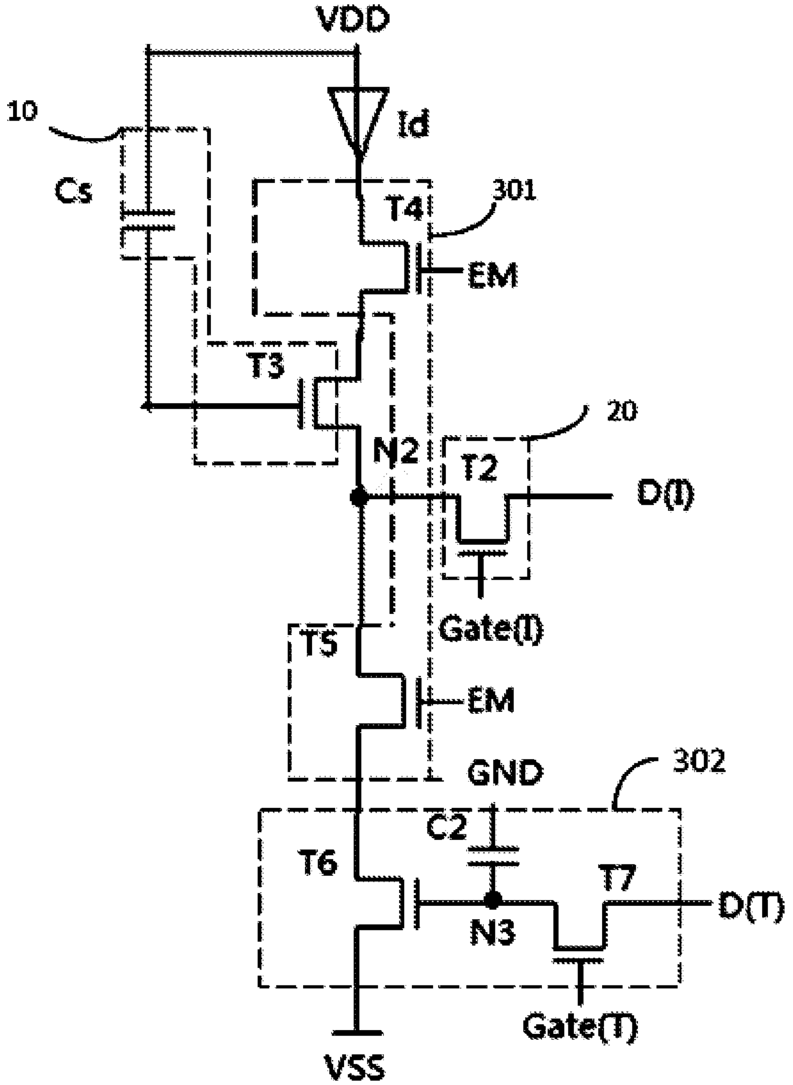
FIG. 1B shows a schematic structural diagram of a pixel drive circuit, according to some embodiments of the present disclosure.
Figure 2:
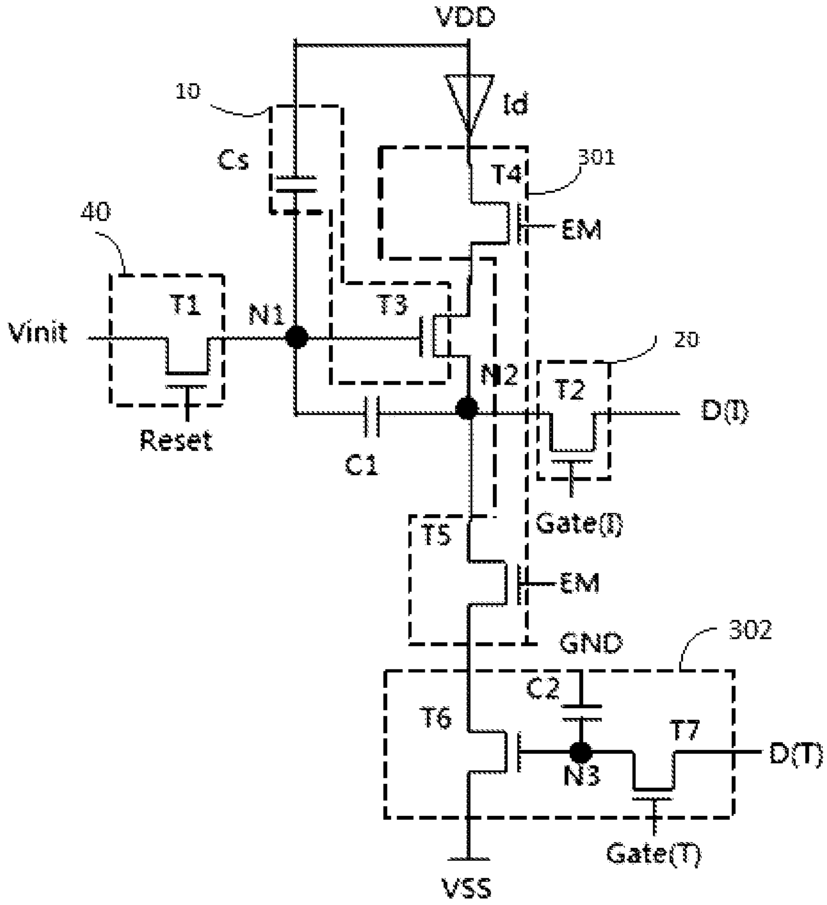
FIG. 2 shows a schematic structural diagram of a pixel drive circuit, according to some embodiments of the present disclosure.

Some embodiments of the present application provide a pixel drive circuit which, as shown in FIGS. 1 and 2, includes: a drive sub-circuit 10, a write sub-circuit 20, and a control circuit 30. The control circuit 30 and a light-emitting device L are coupled between a first power supply terminal VDD and a second power supply terminal VSS, and the drive sub-circuit 10, the write sub-circuit 20 and the control circuit 30 are coupled at a first node N2. In an embodiment, the pixel drive circuit is configured to drive a to-be-driven element. In an embodiment, the to-be-driven element may the light-emitting device L.

The pixel drive circuit is described below by taking the to-be-driven element being a light-emitting device as an example.

In an embodiment, the light-emitting device L may be an inorganic light-emitting device. In an embodiment, the light-emitting device may be a micro light-emitting diode, such as a MiniLED or a Micro LED. The MiniLED or Micro LED is sized on the order of micrometers (μm).

In an embodiment, the write sub-circuit 20 further couplers a first scanning signal terminal Gate(I) and a first data signal terminal D(I), and is configured to write a first data voltage Vdata from the first data signal terminal D(I) to the first node N2 under the control of a first scanning signal provided by the first scanning signal terminal Gate(I).

In an embodiment, the control circuit 30 further couples a light-emitting control signal terminal EM, a second scanning signal terminal Gate(T) and a second data signal terminal D(T), and is configured to determine a duration for which the light-emitting device L emits light within one image frame under the control of a light-emitting control signal provided by the light-emitting control signal terminal EM and a second scanning signal provided by the second scanning signal terminal Gate(T).

In an embodiment, the drive sub-circuit 10 is configured to generate a drive current for driving the light-emitting device L to emit light based on the first data voltage Vdata and a first power supply voltage Vdd supplied from the first power supply terminal VDD.

In an embodiment, the light-emitting device L is configured to receive the drive current and emit light for the duration.

In summary, the control circuit 30 may control the duration for which the light-emitting device L emits light within one image frame (may also be referred to as "light-emitting duration"). It will be appreciated that the duration for which the light-emitting device L emits light and light-emitting luminance of the light-emitting device affect the luminance perceived by human eyes (may also be referred to as "effective luminance"), thereby affecting a gray scale of the display. For example, if the light-emitting luminance of the light-emitting device is Lum and the light-emitting duration is P, the luminance perceived by human eyes is Lum*P. In this way, within the time period of one image frame, with a given light-emitting luminous, the luminance perceived by human eyes may be changed by adjusting the light-emitting duration of the light-emitting device, thereby achieving different gray scales. According to an embodiment of the present disclosure, lower luminance is achieved by selecting the light-emitting duration, thereby avoiding the problems of low light-emitting efficiency and color coordinate drift of a light-emitting device (for example, a Micro LED) at low current density, and picture color difference or uniformity caused by inconsistent luminance of different Micro LEDs at the same current.

In an embodiment, the pixel drive circuit may be fabricated on a base substrate by film forming process and patterning process. The base substrate may be made of glass, plastic, polyimide, PCB, PET, or other materials.

Structures of respective sub-circuits in the pixel drive circuit will be described in detail below.

In an embodiment, as shown in FIGS. 1B and 2, the control circuit 30 may include a light-emitting control circuit 301 and a gray scale control circuit 302. The light-emitting control circuit 301 couples the light-emitting control signal terminal EM, the drive sub-circuit 10, and the gray scale control circuit 302. The light-emitting control circuit 301 is configured to transmit, under the control of a light-emitting control signal provided by the light-emitting control signal terminal EM, the first power supply voltage Vdd supplied from the first power supply terminal VDD to the drive sub-circuit 10.

The light-emitting control circuit 301 is further configured to transmit, under the control of a light-emitting control signal provided by the light-emitting control signal terminal EM, a drive current generated by the drive sub-circuit 10 to the gray scale control circuit 302.

The gray scale control circuit 302 further couples the second scanning signal terminal Gate(T) and the second data signal terminal D(T). The gray scale control circuit 302 is configured to determine whether the light-emitting device L emits light under the control of a second scanning signal provided by the second scanning signal terminal Gate(T) and a second data voltage provided by the second data signal terminal D(T).

As described above, the drive current generated by the drive sub-circuit 10 can be supplied to the light-emitting device L which then emits light only when the light-emitting control circuit 301 and the gray scale control circuit 302 are both in the on state. In other words, the light-emitting device L can emit light only when both the light-emitting control circuit 301 and the gray scale control circuit 302 provide a current-connection path to the light-emitting device L.

In this way, the effective luminance of the light-emitting device L may be cooperatively controlled by the light-emitting control circuit 301 and the gray scale control circuit 302, which increases the factors affecting the effective luminance of the light-emitting device L, and further diversifies the gray scale values that can be displayed by the sub-pixel having the pixel drive circuit. For example, the effective luminance of the light-emitting device L may be affected by a duration for which the light-emitting control circuit 301 and the gray scale control circuit 302 provide the current-connection path to the light-emitting device L.

When a drive transistor (i.e., a third transistor T3 described later) in the drive sub-circuit 10 is operated in a saturation region, the drive transistor may generate a drive current I according to a gate voltage and a source voltage of the transistor. According to equation for the drive current $I=K(Vgs-Vth)^2$, where I is the drive current, K=W/LCu, W/L is a width-to-length ratio of the drive transistor, C is a channel insulation layer capacitance, u is a channel carrier mobility, Vgs is the gate-source voltage, and Vth is a threshold voltage of the drive transistor, it can be concluded that the drive current I is affected by the threshold voltage Vth of the drive transistor. Since the threshold voltage Vth of the drive transistor will be shifted due to variations of the operating time, the operating environment temperature and the like during operation of the drive transistor, and the shift amounts of the threshold voltages Vth of the drive transistors in different sub-pixels may not the same, the drive currents I generated by the drive transistors in different sub-pixels may differ when all the sub-pixels display the same gray scale, which may lead to inconsistent luminance of the light-emitting devices L in different sub-pixels, and thus affect the display effect.

In an embodiment, the pixel drive circuit further include a compensation sub-circuit. One terminal of the compensation sub-circuit is coupled to the drive sub-circuit 10 at a first node N2, another terminal of the compensation sub-circuit is coupled to the drive sub-circuit 10 at a second node N1, and the compensation sub-circuit is configured to write a threshold voltage of the drive sub-circuit 10 to the second node N1. The process of compensating for the threshold voltage will be described later.

In an embodiment, the compensation sub-circuit includes a first capacitor C1. One end of the first capacitor C1 is coupled to the first node N2, and the other end of the first capacitor C1 is coupled to the second node N1.

In an embodiment, the pixel drive circuit further include a reset sub-circuit 40. The reset sub-circuit 40 couples a reset voltage terminal Vinit, a reset control signal terminal Reset, and the second node N1, and the reset sub-circuit 40 is configured to transmit a reset voltage Vreset supplied from the reset voltage terminal to the drive sub-circuit 10 under the control of the reset control signal terminal Reset.

In an embodiment, the write sub-circuit 20 may include a second transistor T2, the light-emitting control circuit 301 may include a fourth transistor T4 and a fifth transistor T5, the gray scale control circuit may include a sixth transistor T6, a seventh transistor T1, and a second capacitor C2, the drive sub-circuit 10 may include a third transistor T3 and a storage capacitor Cs, and the reset sub-circuit may include a first transistor T1.

In an embodiment, as shown in FIG. 2, a control electrode of the first transistor T1 is coupled to the reset signal control terminal Reset, a first electrode of the first transistor T1 is coupled to the reset voltage terminal Vinit, and a second electrode of the first transistor T1 is coupled to the second node N1.

In an embodiment, a control electrode of the second transistor T2 is coupled to the first scanning signal terminal Gate(I), a first electrode of the second transistor T2 is coupled to the first data signal terminal D(I), and a second electrode of the second transistor T2 is coupled to the first node N2.

In an embodiment, a control electrode of the third transistor T3 is coupled to the second node, a first electrode of the third transistor T3 is coupled to a second electrode of the fourth transistor T4, a second electrode of the third transistor T3 is coupled to the first node N2, and one end of the storage capacitor Cs is coupled to the first power supply terminal VDD, and the other end of the storage capacitor Cs is coupled to the second node N1.

In an embodiment, a control electrode of the fourth transistor T4 is coupled to the light-emitting control signal terminal, a first electrode of the fourth transistor T4 is coupled to the light-emitting device L, and a second electrode of the fourth transistor T4 is coupled to the first electrode of the third transistor T3.

In an embodiment, a control electrode of the fifth transistor T5 is coupled to the light-emitting control signal terminal EM, a first electrode of the fifth transistor T5 is coupled to the first node N2, and a second electrode of the fifth transistor T5 is coupled to the first electrode of the sixth transistor T6.

In an embodiment, a control electrode of the sixth transistor T6, one end of the second capacitor C2, and a first electrode of the seventh transistor T1 are coupled at a third node N3, a second electrode of the sixth transistor T6 is coupled to the second power supply terminal VSS, and the other end of the second capacitor C2 is coupled to a third power supply terminal GND, and a control electrode of the seventh transistor T1 is coupled to the second scanning signal terminal Gate(T), a second electrode of the seventh transistor T1 is coupled to the second data signal terminal D(T).

In an embodiment, the first power supply terminal VDD may supply a high-level power supply voltage VDD, the second power supply terminal VSS may supply a low-level power supply voltage VDD, and the third power supply terminal GND may be grounded.

In summary, in a case where the sixth transistor T6 is turned on, when the third to fifth transistors T3 to T5 are all turned on, a drive current generated by the third transistor T3 may flow through the light-emitting device L to make the light-emitting device L emit light. In a case where the sixth transistor T6 is turned off, when the third to fifth transistors T3 to T5 are all turned on, the drive current generated by the third transistor T3 cannot flow through the light-emitting device L, and the light-emitting device L does not emit light.

It will be appreciated that each image frame includes a scanning phase including a data read phase and a light-emitting phase. When one image frame includes a plurality of scanning phases, the sixth transistor T6 is turned on in the light-emitting phases of some scanning phases, and turned off in the light-emitting phases of some other scanning phases. In this way, the duration for which the light-emitting device L emits light within one image frame may be controlled. In other words, the gray scale displayed is changed by changing the number of light-emitting phases during which the sixth transistor T6 is turned on. For example, if the sixth transistor T6 is turned off in all the plurality of light-emitting phases, the displayed gray scale is 0. For example, if the sixth transistor T6 is turned on in a minority of the plurality of light-emitting phases, the displayed gray scale is at a lower value. If the sixth transistor T6 is turned on in a majority of the plurality of light-emitting phases, the gray scale displayed is at a larger value.

According to an embodiment of the present disclosure, there is provided a method for driving a pixel drive circuit. The pixel drive circuit is a pixel drive circuit according to any embodiment of the present disclosure. The method includes the following steps S100 to S102.

Step S100 includes providing, in a data write phase, a first scanning signal to the first scanning signal terminal, and a first data voltage to the first data signal terminal, and writing the first data voltage into the drive sub-circuit via the write sub-circuit.

Step S101 includes: providing, in the first scanning phase, a second scanning signal to the second scanning signal terminal, and a second data voltage to the second data signal terminal so that the gray scale control circuit provides a current-connection path or a current-disconnection path to the light-emitting device under the control of the second scanning signal and the second data voltage; and providing a light-emitting control signal to the light-emitting control signal terminal such that the light-emitting control circuit provides a current-connection path to the light-emitting device under the control of the light-emitting control signal.

Step S102 includes: providing, in the second scanning phase, a second scanning signal to the second scanning signal terminal, and a second data voltage to the second data signal terminal such that the gray scale control circuit provides a current-connection path or a current-disconnection path to the light-emitting device under the control of the second scanning signal and the second data voltage; and providing a light-emitting control signal to the light-emitting control signal terminal such that the light-emitting control circuit provides a current-connection path to the light-emitting device under the control of the light-emitting control signal.

In an embodiment, in response to the second data voltage at an active level, the light-emitting device emits light under the common control of the current-connection path provided by the gray scale control circuit and the current-connection path provided by the light-emitting control circuit; and in response to the second data voltage at an inactive level, the light-emitting device does not emit light under the common control of the current-disconnection path provided by the gray scale control circuit and the current—connection path provided by the light-emitting control circuit.

A method for driving the pixel drive circuit according to an embodiment of the present disclosure is described in detail below.

In the following driving method, the description will be made by taking an example in which each transistor is an N-type transistor. In some embodiments, the transistor in each sub-circuit may be a P-type transistor. The control electrode of the transistor may be a gate electrode. The first electrode of the transistor may be a source electrode, and the second electrode of the transistor may be a drain electrode. Alternatively, the first electrode of the transistor is the drain electrode, and the second electrode of the transistor is the source electrode.

In an embodiment, the third transistor T3 may be a drive transistor, and the first, second, and fourth to seventh transistors may be switch transistors.

Figure 3:
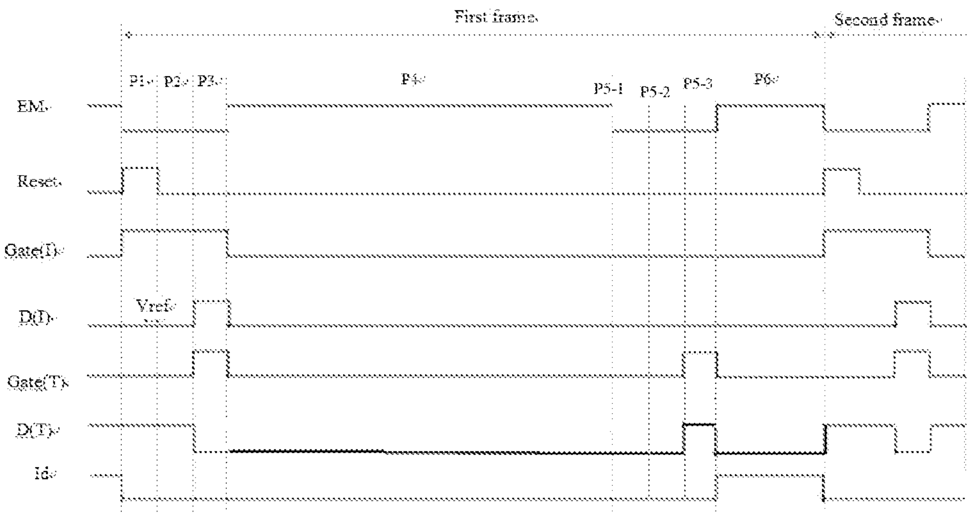
FIG. 3 shows a timing diagram of a method for driving a pixel drive circuit according to some embodiments of the present disclosure.

In some embodiments, to enable the sub-pixel having the pixel drive circuit to display more gray scale values and show a better display effect, one image frame may include a plurality of scanning phases. For example, as shown in FIG. 3, the first scanning phase includes a first data read phase P3 and a first light-emitting phase P4, and the second scanning phase includes a second data read phase P5-3 and a second light-emitting phase P6. The driving method includes a reset phase P1, a threshold compensation phase P2, a first data read phase (data write phase) P3, a first light-emitting phase P4, a second data read phase P5-3 and a second light-emitting phase P6.

In the reset phase P1, a reset control signal is provided to the reset control signal terminal Reset, and a first scanning signal is provided to the first scanning signal terminal Gate(I), a reset voltage Vreset is written into one end of the first capacitor C1 via the reset sub-circuit 40, and a first data signal Vref is written into the other end of the first capacitor C1 via the write sub-circuit 20, so as to reset potentials at two ends of the first capacitor C1.

Figure 5:
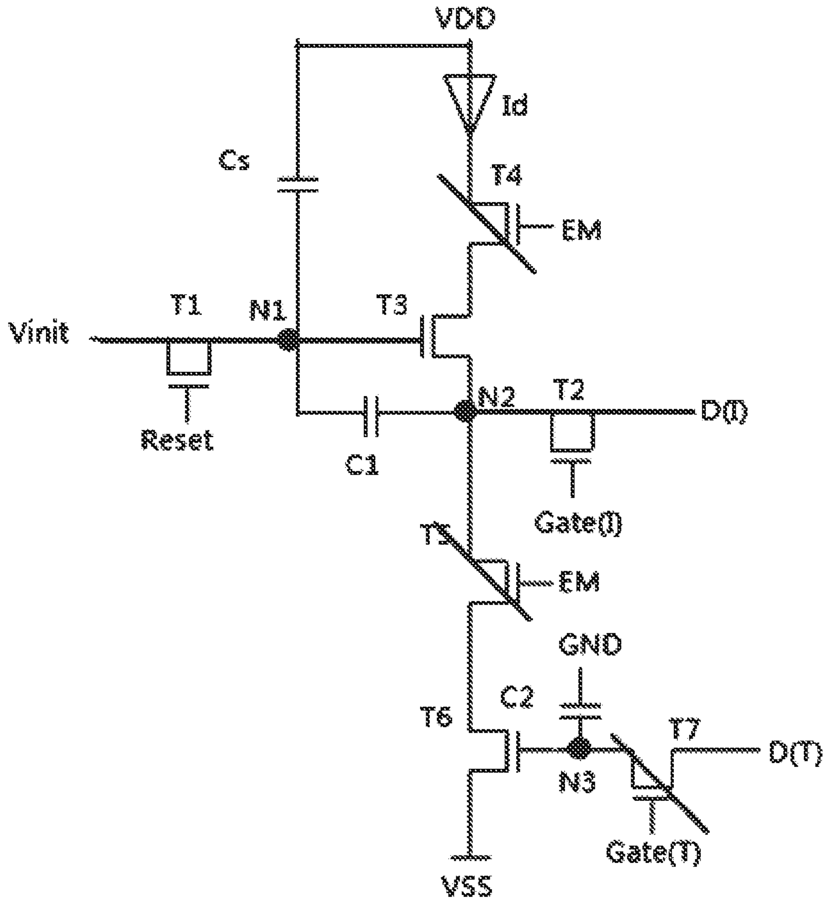
FIG. 5 shows an equivalent circuit diagram of a method for driving a pixel drive circuit according to some embodiments of the present disclosure.

Referring to FIG. 3, in the reset phase P1, the reset control signal terminal Reset and the first scanning signal terminal Gate(I) are at a high level, and the first transistor T1 and the second transistor T2 are turned on. The light-emitting control signal terminal EM and the second scanning signal terminal Gate(T) are at a low level, and the fourth transistor T4, the fifth transistor T5 and the seventh transistor T1 are turned off. FIG. 5 shows an equivalent circuit diagram in the reset phase P1, where the reset voltage Vreset is written to the second node N1 via the first transistor T1, and the first data signal Vref is written to the first node N2 via the second transistor T2.

It should be noted that, in the embodiment, referring to FIGS. 5 to 10, oblique lines at a transistor indicate that the transistor is off, and thick solid lines indicate current-connection paths.

In the threshold compensation phase P2, providing the reset control signal to the reset control signal terminal Reset is stopped, and providing the first scanning signal to the first scanning signal terminal Gate(I) is continued so that the threshold voltage of the third transistor T3 is stored in the first capacitor C1.

Figure 6:
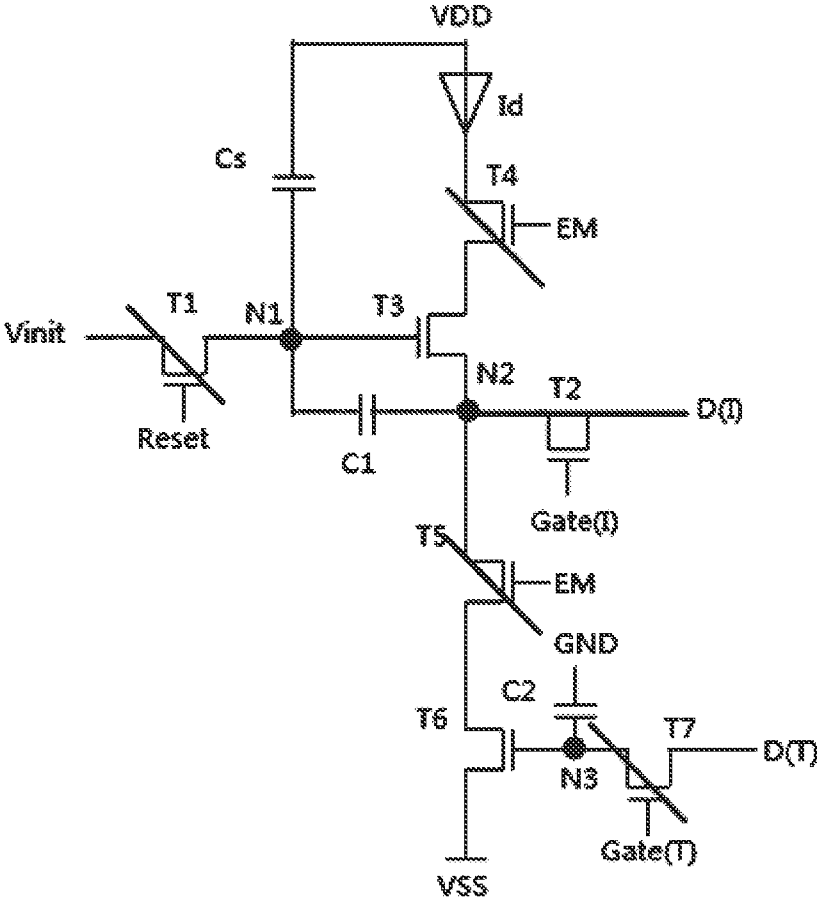
FIG. 6 shows an equivalent circuit diagram of a method for driving a pixel drive circuit according to some embodiments of the present disclosure.
Figure 7:
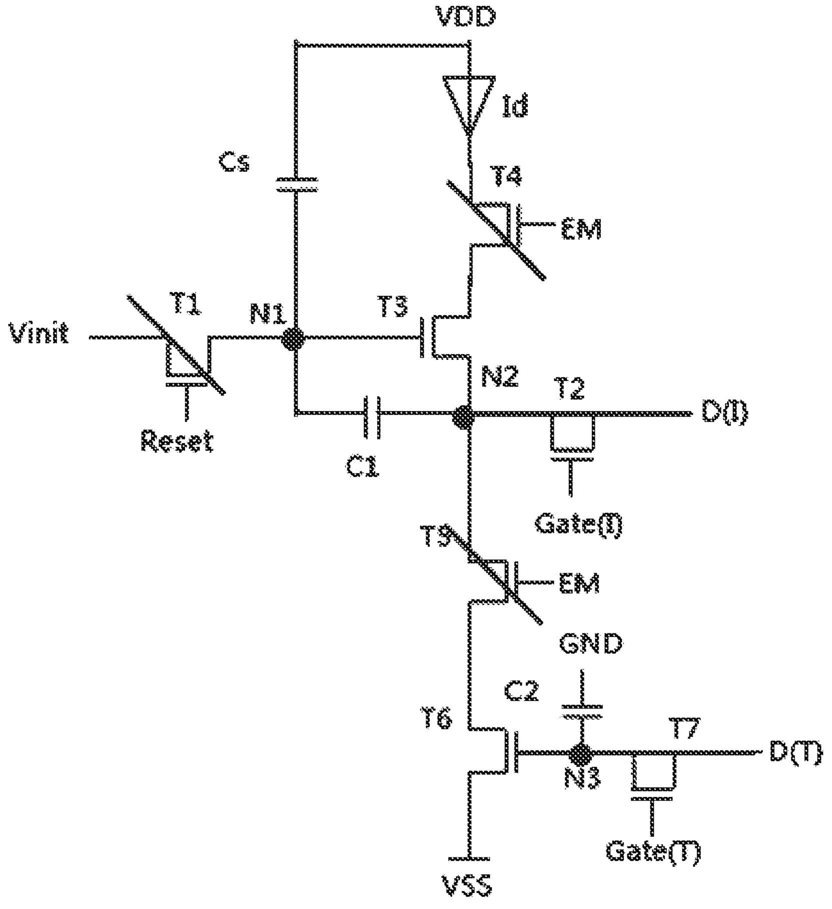
FIG. 7 shows an equivalent circuit diagram of a method for driving a pixel drive circuit according to some embodiments of the present disclosure.

Referring to FIGS. 3 and 6, FIG. 6 shows an equivalent circuit diagram in the threshold compensation phase P2. In the threshold compensation phase P2, the light-emitting control signal terminal EM remains at a low level, and the fourth transistor T4 and the fifth transistor T5 are turned off. The reset control signal terminal Reset is at a low level, and the first transistor T1 is turned off. The first scanning signal terminal Gate(I) is at a high level, and the first node N2 remains at a potential of Vref. The potential of the second node N1 changes from Vreset to (Vref+Vth), where Vth is the threshold voltage of the third transistor T3.

In the data write phase P3, a first scanning signal is provided to the first scanning signal terminal Gate(I), a first data voltage Vdata is provided to the first data signal terminal D(I), and the first data voltage Vdd is written into the drive sub-circuit 10 via the write sub-circuit 20.

In the first data read phase P3, a second scanning signal is provided to the second scanning signal terminal Gate(T), a second data voltage at a low level is provided to the second data signal terminal D(T), and in this case the gray scale control circuit 302 provides a current-disconnection path to the light-emitting device L.

In an embodiment, the data write phase P3 and the first data read phase P3 may occur simultaneously.

Referring to FIGS. 3 to 7, FIG. 7 shows an equivalent circuit diagram in the data write phase and the first data read phase P3, where the light-emitting control signal terminal EM and the reset control signal terminal Reset remain at a low level, and the first transistor T1, the fourth transistor T4 and the fifth transistor T5 remain turned off. The first scanning signal terminal Gate(I) remains at a high level. At this time, the first data voltage Vdata is provided to the third transistor T3, so the potential of the first node N2 jumps from Vref in the threshold compensation phase P2 to the first data voltage Vdata. With the charge in the first capacitor C1 retained, the potential of the second node N1 jumps from (Vref+Vth) to (Vdata+Vth). At this time, the second scanning signal terminal Gate(T) is at a high level, the seventh transistor T7 is turned on, a second data voltage at a low level provided from the second data signal terminal D(T) is stored in the third node N3, and the sixth transistor T6 is turned off.

In the first light-emitting phase P4, a light-emitting control signal is provided to the light-emitting control signal terminal EM, the light-emitting control circuit 301 provides a current-connection path to the light-emitting device L, while the gray scale control circuit 302 provides a current-disconnection path to the light-emitting device L, so that the light-emitting device L does not emit light in the first light-emitting phase P4.

Figure 8:
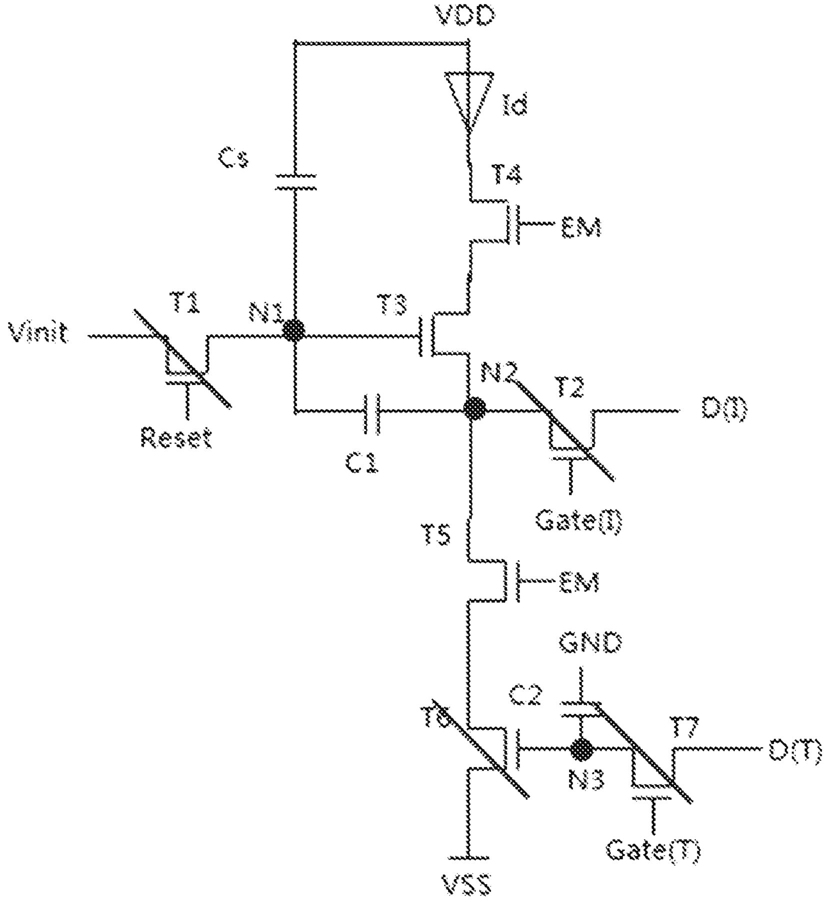
FIG. 8 shows an equivalent circuit diagram of a method for driving a pixel drive circuit according to some embodiments of the present disclosure.

Referring to FIGS. 3 and 8, FIG. 8 shows an equivalent circuit diagram in the first light-emitting phase P4, where the reset signal control terminal Reset, the first scanning signal terminal Gate(I), the second scanning signal terminal Gate (T) are at a low level, and the first transistor T1, the second transistor T2 and the seventh transistor T7 are turned off. The light-emitting control signal terminal EM is at a high level, the fourth transistor T4 and the fifth transistor T5 are turned on, and the third transistor T3 generate saturation current according to the saturation current equation. However, since in the previous phase, a low level is stored in the third node N3, the sixth transistor T6 is turned off, and thus the gray scale control circuit 302 provides a current-disconnection path to the light-emitting device so that no current flows from the first power supply terminal VDD to the second power supply terminal VSS, and the light-emitting device L does not emit light.

In the second data read phase P5-3, a second scanning signal is provided to the second scanning signal terminal Gate(T), a second data voltage at a high level is provided to the second data signal terminal D(T), and in this case, the gray scale control circuit 302 provides a current-connection path to the light-emitting device L until the end of the second light-emitting phase P6.

Figure 9:
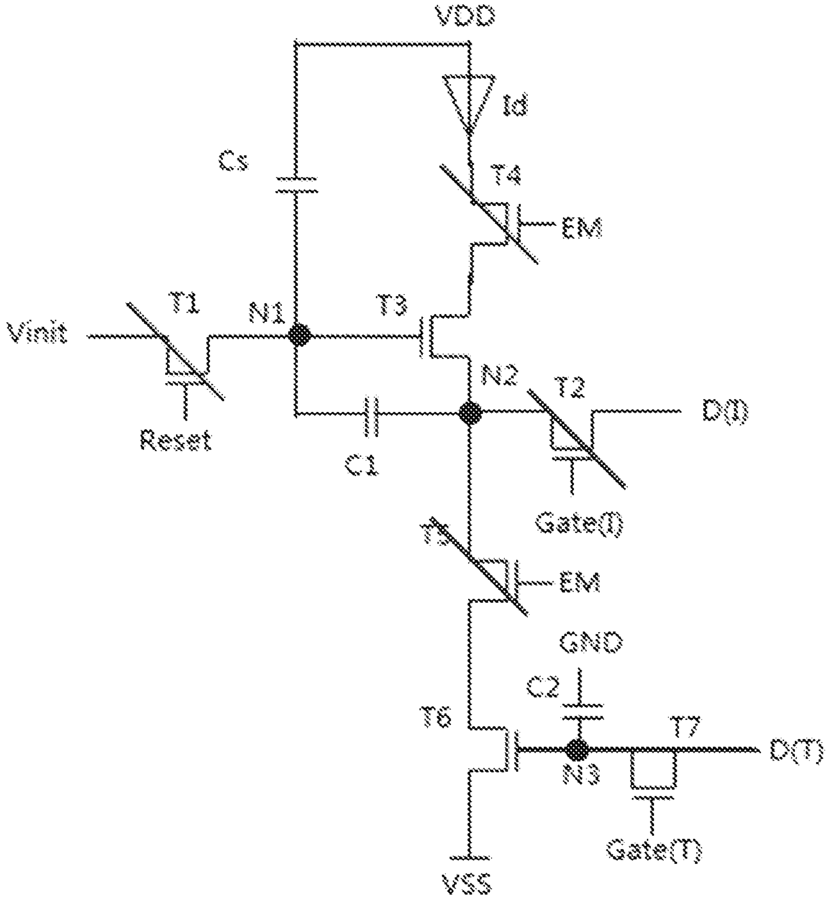
FIG. 9 shows an equivalent circuit diagram of a method for driving a pixel drive circuit according to some embodiments of the present disclosure.

Referring to FIGS. 3 and 9, FIG. 9 shows an equivalent circuit diagram in the second data read phase P5-3, where the light-emitting control signal terminal EM is at a low level, and the fourth transistor T4 and the fifth transistor T5 are turned off. The reset control signal terminal Reset and the first scanning signal terminal Gate(I) are at a low level, and the first transistor T1 and the second transistor T2 remain turned off. The second scanning signal terminal Gate(T) is at a high level, the seventh transistor T1 is turned on, and the third node N3 reads the high level of the second data signal terminal D(T) and the high level is stored in the third node N3.

In an embodiment, in the second data read phase P5-3, the second scanning signal terminal Gate(T) is at a high level, and the second data signal terminal D(T) is at a high level. In a time period other than the second data read phase P5-3, both the second scanning signal terminal Gate(T) and the second data signal terminal D(T) are at low level, where the second data read phase P5-3 occupies the same duration as the first data read phase P3. In this way, the drive chip may facilitate driving of a pixel array including a plurality of pixel drive circuits through a shift register, thereby simplifying the structure of the shift register.

In the second light-emitting phase P6, a light-emitting control signal is provided to the light-emitting control signal terminal EM, both the light-emitting control circuit 301 and the gray scale control circuit 302 provide a current connection path to the light-emitting devices L so that the light-emitting device L emits light in the second light-emitting phase P6.

Figure 10:
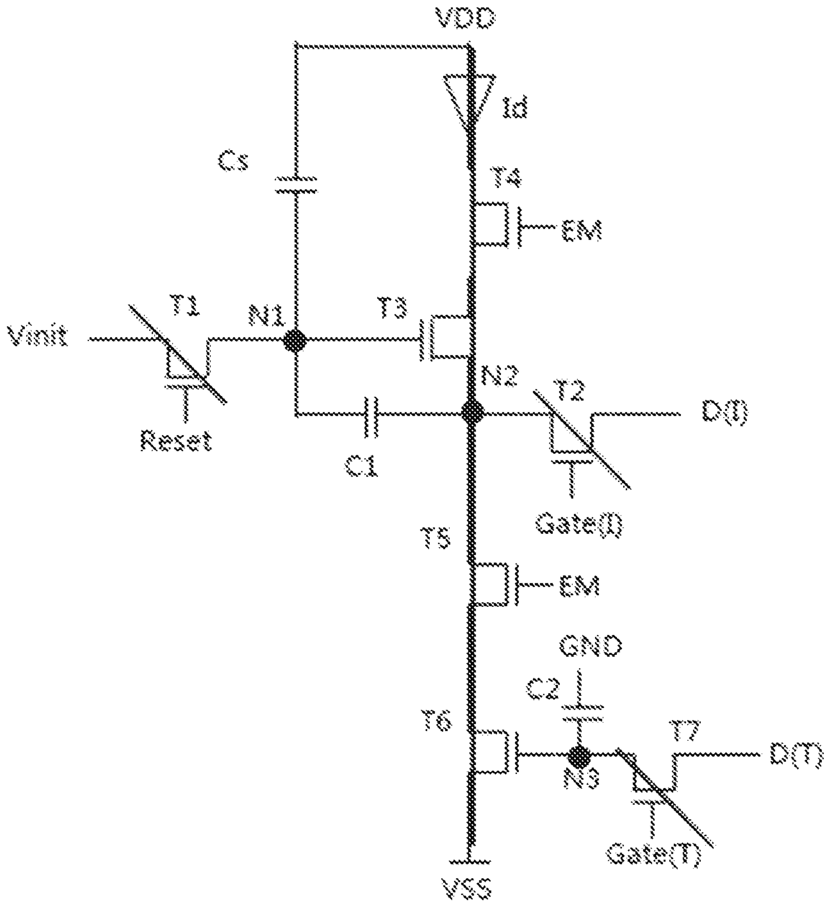
FIG. 10 shows an equivalent circuit diagram of a method for driving a pixel drive circuit according to some embodiments of the present disclosure.
Figure 11:
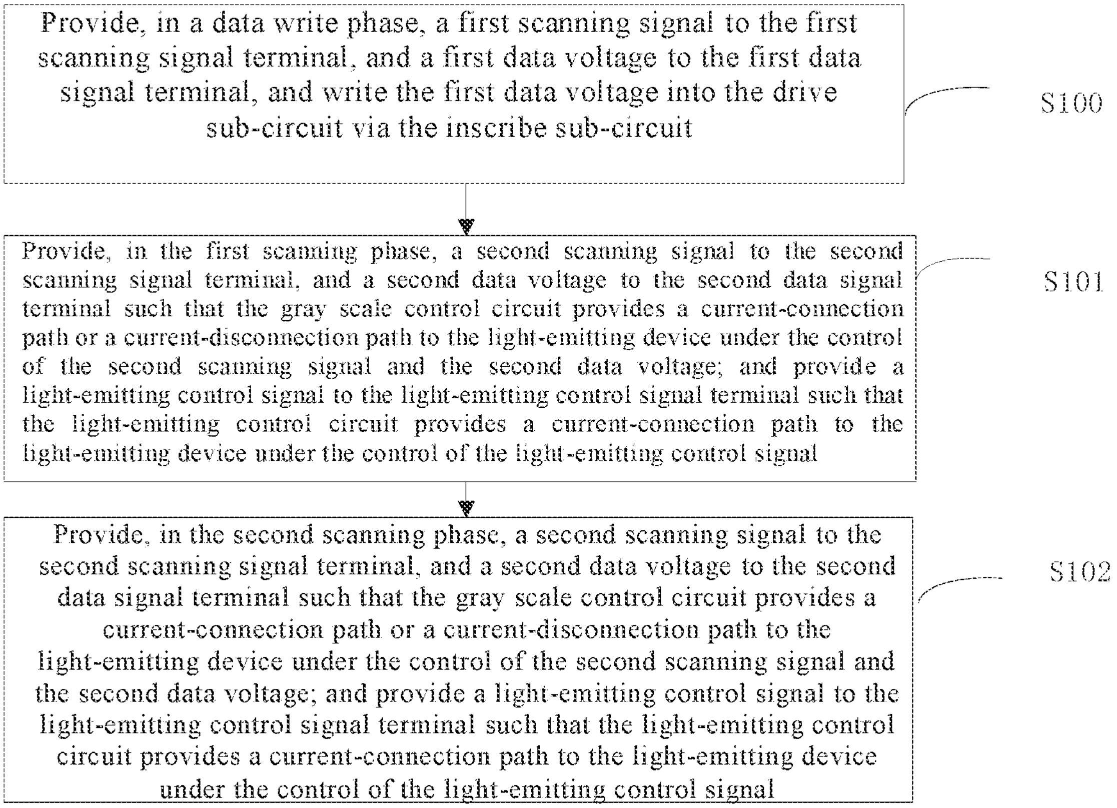
FIG. 11 shows a flowchart of a method for driving a pixel drive circuit according to some embodiments of the present disclosure.

Referring to FIGS. 3 and 10, FIG. 10 shows an equivalent circuit diagram in the second light-emitting phase P6. The reset control signal terminal Reset and the first scanning signal terminal Gate(I) remain at a low level, the second scanning signal terminal Gate(T) is at a low level, and the first transistor T1, the second transistor T2 and the seventh transistor T1 are turned off. The light-emitting control signal terminal EM is at a high level, and the fourth transistor T4 and the fifth transistor T5 are turned on. Since the high level is stored in the third node N3, the sixth transistor T6 remains turned on. The saturation current generated by the third transistor T3 flows from the first power supply terminal VDD through the light-emitting device L, into the second power supply terminal VSS, and the light-emitting device emits light. The light-emitting duration includes only the duration p6 of the second light-emitting phase P6 in FIG. 3. The luminance perceived by human eyes is proportional to the light-emitting luminance and light-emitting duration of the light-emitting device.

Therefore, according to an embodiment of the present disclosure, in one image frame, the luminance of the sub-pixel where the pixel drive circuit is located perceived by human eyes is: Lum*$T_{p6}$, where Lum represents the light-emitting luminance of the light-emitting device in the sub-pixel, and $T_{p6}$ represents the duration of the second light-emitting phase P6.

Another embodiment of the present disclosure provides a method for driving a pixel drive circuit, which is the same as the abovementioned driving method except for the first data read phase P3 and the first light-emitting phase P4, and is not repeated herein.

Figure 4:
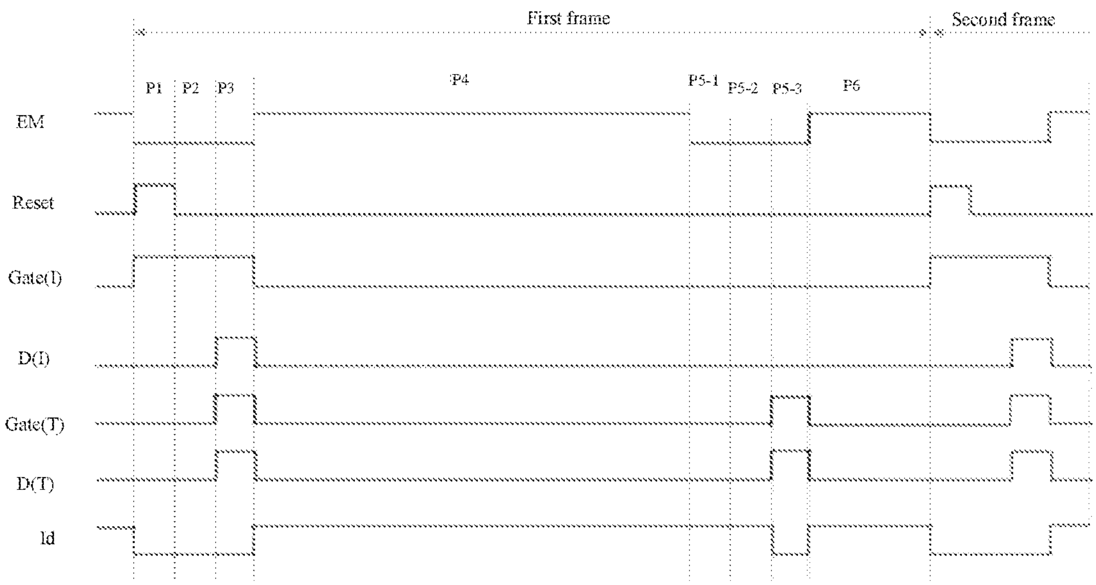
FIG. 4 shows a timing diagram of a method for driving a pixel drive circuit according to some embodiments of the present disclosure.

Specifically, as shown in FIG. 4, in the first data read phase P3, the voltage of the second data signal terminal d (T) is at a high level so that the high-level second data voltage is stored in the third node N3, and the sixth transistor T6 is turned on. In this way, in the first light-emitting phase P4, since the high level is stored in the third node N3, the sixth transistor T6 remains turned on. The saturation current generated by the third transistor T3 flows from the first power supply terminal VDD through the light-emitting device L, into the second power supply terminal VSS, and the light-emitting device L emits light. The light-emitting duration is a sum of the duration p4 of the first light-emitting phase P4 and the duration p6 of the second light-emitting phase P6 in FIG. 4. Therefore, in one image frame, the luminance of the sub-pixel where the pixel drive circuit is located perceived by human eyes is: Lum*$T_{(p4+p6)}$, where Lum represents the light-emitting luminance of the light-emitting device in the sub-pixel, and $T_{(p4+p6)}$ is a sum of the duration of the first light-emitting phase P4 and the duration of the second light-emitting phase P6.

In an embodiment, the drive current generated by the third transistor T3 is I=K $(Vgs-Vth)^2$, where K=W/L·C·u, W/L is a width-to-length ratio of the drive transistor, C is a channel insulation layer capacitance, u is a channel carrier mobility, and Vgs is the gate-source voltage. In the second light-emitting phase P6, a gate voltage of the third transistor T3 is Vdata+Vth, and a source voltage of the third transistor T3 is Vdd, so Vgs=Vdata+Vth-Vdd. Taking Vgs=Vdata+Vth-Vdd into the above equation I=K $(Vgs-Vth)^2$, I=K $(Vdata-Vdd)^2$. Therefore, the third transistor T3 generates a drive current independent of the threshold voltage of the third transistor T3 itself. Therefore, the magnitude of the drive current will not change as the threshold voltage Vth of the third transistor T3 shifts.

In an embodiment, since the light-emitting luminance Lum of the light-emitting device L is proportional to the magnitude of the drive current I, the luminance of the sub-pixel where the pixel drive circuit is located, which is perceived by human eyes, is further related to the voltage Vdata of the first data signal terminal D(I).

In an embodiment, since Lum*$T_{p6}$–Lum*$T_{(p4+p6)}$, when the first data signal terminal D(I) provides the same voltage Vdata, the driving timing shown in FIG. 3 may implement display of a lower gray scale, and the driving timing shown in FIG. 4 may implement display of a medium or higher gray scale.

Thus, by adjusting the light-emitting duration of the light-emitting device in one image frame, the luminance perceived by human eyes can be changed, thereby adjusting the displayed gray scale. According to an embodiment of the present disclosure, lower luminance is achieved by selecting the light-emitting duration, thereby avoiding the problem of image nonuniformity due to inconsistent luminance of different light-emitting devices (e.g., Micro LEDs) at a lower current density.

According to an embodiment of the present disclosure, when one image frame includes a plurality of light-emitting phases, the sixth transistor T6 may be turned on in some light-emitting phases, and turned off in other light-emitting phases. In this way, the displayed gray scale may be changed by changing the number of light-emitting phases during which the sixth transistor T6 is turned on. For example, if the sixth transistor T6 is turned off in all the plurality of light-emitting phases, the displayed gray scale is 0. For example, when the first data signal terminal D(I) provides the same first data voltage Vdata, if the sixth transistor T6 is turned on in a minority of the plurality of light-emitting phases, the displayed gray scale is at a lower value. If the sixth transistor T6 is turned on in a majority of the plurality of light-emitting phases, the displayed gray scale is at a larger value. In this way, by changing a magnitude of the first data voltage Vdata provided by the first data signal terminal D(I) while adjusting the number of light-emitting phases during which the sixth transistor T6 is turned on, the sub-pixel having the pixel drive circuit may display more gray scale values, and the image displayed on the display panel may be more rich and delicate.

In an embodiment, the displayed gray scales may be further adjusted by changing a duration of the light-emitting phase (e.g., by changing the durations of the first and second light-emitting phases P4 and P6).

In an embodiment, the reset phase P1, the threshold compensation phase P2 and the first data read phase P3 may have the same durations. In an embodiment, the second data read phase P5-3 has a duration equal to the duration of the first data read phase P3. In an embodiment, the duration during which the second scanning signal and the second data voltage are active in the second data read phase P5-3 is the same as the duration of the first data read phase P3. Inactive phases P5-1 and P5-2 during which all the signal terminals provide inactive level signals are between the first light-emitting phase P4 and the second data read phase P5-3. The inactive phase P5-1 has the same duration as the reset phase P1, and the inactive phase P5-2 has the same duration as the threshold compensation phase P2. In this way, the drive chip may facilitate driving of a pixel array including a plurality of pixel drive circuits through a shift register, thereby simplifying the structure of the shift register.

The foregoing are merely specific embodiments of the present disclosure, but the protection scope of the disclosure is not limited thereto. Any change or alternative that can be easily thought by those skilled in the art within the technical scope disclosed by the disclosure shall fall in the protection scope of the disclosure. Therefore, the protection scope of the present disclosure shall be determined by the scope of the claims.

What is claimed is:

1. A pixel drive circuit, comprising: a drive sub-circuit, a write sub-circuit and a control circuit coupled at a first node, wherein the write sub-circuit is further coupled to a first scanning signal terminal and a first data signal terminal, and is configured to write a first data voltage from the first data signal terminal to the first node under control of a first scanning signal provided by the first scanning signal terminal;

the control circuit is further coupled to a light-emitting control signal terminal, a second scanning signal terminal and a second data signal terminal, and is configured to determine a duration of providing a driving signal to a to-be-driven element under control of a light-emitting control signal provided by the light-emitting control signal terminal and a second scanning signal provided by the second scanning signal terminal; and the drive sub-circuit is configured to generate the driving signal for driving the to-be-driven element based on the first data voltage and a first power supply voltage supplied from the first power supply terminal, wherein the pixel drive circuit further comprises a reset voltage terminal, a reset control signal terminal, the light-emitting control signal terminal, the first data signal terminal, a second data signal terminal, the first scanning signal terminal, the second scanning signal terminal, the first power supply terminal, second and third power supply terminals, a reset sub-circuit, and a compensation sub-circuit, wherein the reset sub-circuit comprises a first transistor, the compensation sub-circuit comprises a first capacitor, the write sub-circuit comprises a second transistor, the drive sub-circuit comprises a storage capacitor and a third transistor, and the control circuit comprises fourth to seventh transistors and a second capacitor, wherein a first electrode of the first transistor, one end of the first capacitor, a control electrode of the third transistor, and one end of the storage capacitor are coupled at a second node, a control electrode of the first transistor is coupled to the reset control signal terminal, a second electrode of the first transistor is coupled to the reset voltage terminal, the other end of the storage capacitor is coupled to the first power supply terminal, the other end of the first capacitor, a second electrode of the third transistor, a first electrode of the second transistor, and a first electrode of the filth transistor are coupled at the first node, a first electrode of the third transistor is coupled to a second electrode of the fourth transistor, a first electrode of the fourth transistor is coupled to a first electrode of a to-be-driven element, and a control electrode of the fourth transistor is coupled to the light-emitting control signal terminal, the other electrode of the to-be-driven element is coupled to the first power supply terminal, and a control electrode of the second transistor is coupled to the first scanning signal terminal, and a second electrode of the second transistor is coupled to the second data signal terminal, a control electrode of the fifth transistor is coupled to the light-emitting control signal terminal, and a second electrode of the fifth transistor is coupled to a first electrode of the sixth transistor, and a control electrode of the sixth transistor, one end of the second capacitor, and a first electrode of the seventh transistor are coupled at a third node, a second electrode of the sixth transistor is coupled to the second power supply terminal, a control electrode of the seventh transistor is coupled to the second scanning signal terminal, and a second electrode of the seventh transistor is coupled to the second data signal terminal, and the other another end of the second capacitor is coupled to the third power supply terminal.

2. The pixel drive circuit according to claim 1, wherein the control circuit comprises a light-emitting control circuit and a gray scale control circuit, the light-emitting control circuit comprises the fourth transistor and the fifth transistor, and is configured to transmit, under control of the light-emitting control signal provided by the light-emitting control signal terminal, the first power supply voltage supplied from the first power supply terminal to the drive sub-circuit, and transmit the driving signal generated by the drive sub-circuit to the gray scale control circuit; and the gray scale control circuit comprises the sixth transistor, the seventh transistor, and the second capacitor, and is configured to determine whether to transmit the driving signal to the to-be-driven element under control of the second scanning signal provided by the second scanning signal terminal and a second data voltage provided by the second data signal terminal.

3. The pixel drive circuit according to claim 1, wherein the to-be-driven element is a micro light-emitting diode, and the driving signal is a drive current for driving the micro light-emitting diode to emit light.

4. A display device, comprising a display panel having a display area with a plurality of sub-pixels, each of the plurality of sub-pixels having the pixel drive circuit according to claim 1 disposed therein.

5. A method for driving a pixel drive circuit, wherein the pixel drive circuit comprises: a drive sub-circuit, a write sub-circuit and a control circuit coupled at a first node, wherein the write sub-circuit is further coupled to a first scanning signal terminal and a first data signal terminal, and is configured to write a first data voltage from the first data signal terminal to the first node under control of a first scanning signal provided by the first scanning signal terminal;

the control circuit is further coupled to a light-emitting control signal terminal, a second scanning signal terminal and a second data signal terminal, and is configured to determine a duration of providing a driving signal to a to-be-driven element under control of a light-emitting control signal provided by the light-emitting control signal terminal and a second scanning signal provided by the second scanning signal terminal; and the drive sub-circuit is configured to generate the driving signal for driving the to-be-driven element based on the first data voltage and a first power supply voltage supplied from the first power supply terminal, wherein a plurality of scanning phases arm comprised in one image frame, each of the plurality of scanning phases comprising a first scanning phase and a second scanning phase; the gray scale control circuit comprises a light-emitting control circuit and a gray scale control circuit;

and the driving method comprises: within one image frame, providing, in a data write phase, the first scanning signal to the first scanning signal terminal, and the first data voltage to the first data signal terminal, and writing the first data voltage into the drive sub-circuit via the write sub-circuit;

providing, in the first scanning phase, the second scanning signal to the second scanning signal terminal, and a second data voltage to the second data signal terminal such that the gray scale control circuit provides a current-connection path or a current-disconnection path to the to-be-driven element under control of the second scanning signal and the second data voltage; and providing a light-emitting control signal to the light-emitting control signal terminal such that the light-emitting control circuit provides a current-connection path to the to-be-driven element under control of the light-emitting control signal; and providing, in the second scanning phase, the second scanning signal to the second scanning signal terminal, and the second data voltage to the second data signal terminal such that the gray scale control circuit provides the current-connection path or the current-disconnection path to the to-be-driven element under control of the second scanning signal and the second data voltage; and providing the light-emitting control signal to the light-emitting control signal terminal such that the light-emitting control circuit provides the current-connection path to the to-be-driven element under control of the light-emitting control signal, wherein in response to the second data voltage at an active level, the to-be-driven element is driven under common control of the current-connection path provided by the gray scale control circuit and the current-connection path provided by the light-emitting control circuit;

and in response to the second data voltage at an inactive level, the to-be-driven element is not driven under common control of the current-disconnection path provided by the gray scale control circuit and the current-connection path provided by the light-emitting control circuit, wherein the first scanning phase comprises a first data read phase and a first light-emitting phase, and the second scanning phase comprises a second data read phase and a second light-emitting phase, in the first data read phase, the second scanning signal is provided to the second scanning signal terminal, the second data voltage at an inactive level is provided to the second data signal terminal, and the gray scale control circuit provides the current-connection path to the to-be-driven element, and in the first light-emitting phase, the light-emitting control signal is provided to the light-emitting control signal terminal, and the light-emitting control circuit provides the current-connection path to the to-be-driven element while the gray scale control circuit provides the current-disconnection path to the to-be-driven element so that the to-be-driven element is not driven in the first light-emitting phase; and in the second data read phase, the second scanning signal is provided to the second scanning signal terminal, the second data voltage at an active level is provided to the second data signal terminal, and the gray scale control circuit provides the current-connection path to the to-be-driven element until end of the second light-emitting phase, and in the second light-emitting phase, the light-emitting control signal is provided to the light-emitting control signal terminal, and both the light-emitting control circuit and the gray scale control circuit provide the current-connection path to the to-be-driven element so that the to-be-driven element is driven in the second light-emitting phase.

6. The method according to claim 5, wherein the first scanning phase comprises a first data read phase and a first light-emitting phase, and the second scanning phase comprises a second data read phase and a second light-emitting phase, in the first data read phase, the second scanning signal is provided to the second scanning signal terminal, the second data voltage at an active level is provided to the second data signal terminal, and the gray scale control circuit provides the current-connection path to the to-be-driven element until end of the first light-emitting phase, and in the first light-emitting phase, the light-emitting control signal is provided to the light-emitting control signal terminal, and both the light-emitting control circuit and the gray scale control circuit provide the current-connection path to the to-be-driven element so that the to-be-driven element is driven in the first light-emitting phase; and in the second data read phase, the second scanning signal is provided to the second scanning signal terminal, the second data voltage at an active level is provided to the second data signal terminal, and the gray scale control circuit provides the current-connection path to the to-be-driven element until end of the second light-emitting phase, and in the second light-emitting phase, the light-emitting control signal is provided to the light-emitting control signal terminal, and both the light-emitting control circuit and the gray scale control circuit provide the current-connection path to the to-be-driven element so that the to-be-driven element is driven in the second light-emitting phase.

7. The method according to claim 5, wherein the pixel drive circuit further comprises a first capacitor as a compensation sub-circuit, and a reset sub-circuit, one end of the first capacitor is coupled to the first node, the other end of the first capacitor is coupled to a second node, and the reset sub-circuit is coupled to a reset voltage terminal a reset control signal terminal, and the second node, and prior to the data write phase, the method further comprises:

providing, in a reset phase, a reset control signal to the reset control signal terminal, and the first scanning signal to the first scanning signal terminal, writing a reset voltage into one end of the first capacitor via the reset sub-circuit, and writing the first data signal into the other end of the first capacitor via the write sub-circuit, to reset potentials at two ends of the first capacitor.

8. The method according to claim 7, wherein the drive sub-circuit comprises a third transistor and a storage capacitor, a control electrode of the third transistor is coupled to the second node, a first electrode of the third transistor is coupled to the light-emitting control circuit, a second electrode of the third transistor is coupled to the first node, and one end of the storage capacitor is coupled to the first power supply terminal, and the other end of the storage capacitor is coupled to the second node, and prior to the data write phase and after the reset phase, the method further comprises: a threshold compensation phase of stopping providing the reset control signal to the reset control signal terminal, and continuing providing the first scanning signal to the first scanning signal terminal such that a threshold voltage of the third transistor is stored in the first capacitor.

9. The method according to claim 8, wherein the data write phase and the first data read phase of the first scanning phase are performed simultaneously.

10. The method according to claim 9, wherein the second data read phase occupies the same duration as the first data read phase.

* * * * *